US011375775B2

(12) United States Patent
Wang

(10) Patent No.: US 11,375,775 B2
(45) Date of Patent: Jul. 5, 2022

(54) METHOD FOR PRODUCING ANTIBACTERIAL SHOCK ABSORBING SHOES

(71) Applicant: WENZHOU ZHONGXI IMPORT AND EXPORT CO., LTD, Wenzhou (CN)

(72) Inventor: Bing Wang, Guizhou (CN)

(73) Assignee: Wenzhou Zhongxi Import and Export Co., Ltd., Zhejiang (CN)

( * ) Notice: Subject to any disclaimer, the term of this patent is extended or adjusted under 35 U.S.C. 154(b) by 373 days.

(21) Appl. No.: 16/607,173

(22) PCT Filed: Dec. 19, 2018

(86) PCT No.: PCT/CN2018/121988
§ 371 (c)(1),
(2) Date: Oct. 22, 2019

(87) PCT Pub. No.: WO2019/214241
PCT Pub. Date: Nov. 14, 2019

(65) Prior Publication Data
US 2021/0401126 A1 Dec. 30, 2021

(30) Foreign Application Priority Data
May 9, 2018 (CN) .......................... 201810438075.6

(51) Int. Cl.
A43B 1/00 (2006.01)
A43B 7/08 (2022.01)
A43D 8/46 (2006.01)
A43D 25/18 (2006.01)
A43D 11/14 (2006.01)
A43B 13/18 (2006.01)

(52) U.S. Cl.
CPC ............ *A43D 11/14* (2013.01); *A43B 1/0045* (2013.01); *A43B 7/08* (2013.01); *A43B 13/18* (2013.01); *A43D 8/46* (2013.01); *A43D 25/18* (2013.01)

(58) Field of Classification Search
CPC ......... A43B 1/0045; A43B 7/08; A43B 13/18; A43D 8/46; A43D 25/18; A43D 11/14
See application file for complete search history.

(56) References Cited

U.S. PATENT DOCUMENTS

| 2,079,669 | A | * | 5/1937 | Weil | A43D 8/46 12/17 A |
| 2,425,906 | A | * | 8/1947 | Waldman | A43B 9/14 12/142 F |
| 3,278,960 | A | * | 10/1966 | Nardone | A43D 25/183 12/142 F |
| 3,860,985 | A | | 1/1975 | Von Schoppe | |
| 4,099,342 | A | * | 7/1978 | Singh | A43B 1/0045 36/44 |
| 5,035,068 | A | | 7/1991 | Biasi | |
| 5,044,096 | A | * | 9/1991 | Polegato | A43B 13/12 36/3 R |
| 5,588,226 | A | * | 12/1996 | Schenkel | A43B 7/08 36/3 B |
| 8,813,391 | B1 | * | 8/2014 | Khaitan | A43B 7/1425 36/44 |
| 9,215,908 | B1 | * | 12/2015 | Malmoux | A43B 13/386 |
| 9,456,660 | B1 | * | 10/2016 | Magdaleno | A43B 17/08 |
| 2003/0073944 | A1 | * | 4/2003 | Shor | A43D 3/021 602/41 |
| 2004/0143997 | A1 | * | 7/2004 | Issler | A43B 17/102 36/71 |
| 2007/0089249 | A1 | * | 4/2007 | Bordin | A43D 3/1491 12/115.6 |
| 2007/0245595 | A1 | * | 10/2007 | Chen | A43B 7/125 36/45 |

(Continued)

FOREIGN PATENT DOCUMENTS

CN 2079044 U 6/1991
CN 201806026 U 4/2011

(Continued)

OTHER PUBLICATIONS

Liu, Yu et al., "How is High-grade Custom Footwear Made" (Non-Official Translation), Trading Up, No. 11, Nov. 30, 2015, p. 116 (English Abstract Provided).
https://www.youtube.com/watch?v=HVXPurvaK5c, "SARA Footwear Manufacturing Process", Dec. 7, 2016.
International Search Report of International Application No. PCT/CN2018/121988, dated Feb. 26, 2019, 6 pages (English Translation provided).

(Continued)

Primary Examiner — Katharine G Kane
(74) Attorney, Agent, or Firm — Fay Sharpe LLP

(57) ABSTRACT

A method for producing antibacterial shock absorbing shoes is provided. The method includes the following steps of: designing a shoe tree and a shoe style, and selecting a material; attaching paper to an outside of the shoe tree to make a paper pattern; manufacturing a bottom pad, a middle pad and a foot pad, and punching a circular hole in the middle pad; soaking the leather pad with an antibacterial agent, punching semi-spherical protrusions and a connecting groove on the leather pad, forming a circular pinhole in a top end of the semi-spherical protrusion, pasting the leather pad on the middle pad with a glue and cutting the leather pad to manufacture a shock absorbing massage pad; wrapping the shoes, and shaping; and placing the shock absorbing massage pads and the foot pads into the shoes. The shoes manufactured have good breathability, shock absorbing property and antibacterial property.

7 Claims, No Drawings

(56) References Cited

U.S. PATENT DOCUMENTS

| | | | | |
|---|---|---|---|---|
| 2009/0205222 | A1* | 8/2009 | McLinden | A43B 1/0045 36/92 |
| 2009/0260258 | A1 | 10/2009 | Spiegel | |
| 2012/0022178 | A1* | 1/2012 | McCluskey | C08J 9/40 521/170 |
| 2012/0144702 | A1* | 6/2012 | Wu | B29D 35/122 36/25 R |
| 2014/0245631 | A1* | 9/2014 | Joseph | A43B 7/141 36/44 |
| 2015/0082669 | A1* | 3/2015 | Peikert | A43B 7/08 36/30 R |
| 2015/0101133 | A1* | 4/2015 | Manz | A43B 1/04 12/142 R |
| 2015/0101134 | A1* | 4/2015 | Manz | G06F 30/00 12/142 R |
| 2015/0250262 | A1* | 9/2015 | Khaitan | A43B 1/0045 36/44 |
| 2015/0366293 | A1* | 12/2015 | Clarkson | A43B 1/04 703/1 |
| 2016/0037864 | A1* | 2/2016 | Chen | A43D 25/20 12/142 F |
| 2016/0374431 | A1* | 12/2016 | Tow | A43D 1/022 36/43 |
| 2017/0170876 | A1 | 6/2017 | Weaver et al. | |
| 2017/0178379 | A1* | 6/2017 | Fu | G06Q 10/043 |
| 2017/0196296 | A1* | 7/2017 | Lee | A01N 59/20 |
| 2018/0317606 | A1* | 11/2018 | Schneider | B29C 37/0053 |

FOREIGN PATENT DOCUMENTS

| | | |
|---|---|---|
| CN | 202085833 U | 12/2011 |
| CN | 104287298 A | 1/2015 |
| CN | 104780014 A | 7/2015 |
| CN | 105745595 A | 7/2016 |
| CN | 105996286 A | 10/2016 |
| CN | 106243461 A | 12/2016 |
| CN | 106307792 A | 1/2017 |
| CN | 206238574 U | 6/2017 |
| CN | 107135526 A | 9/2017 |
| CN | 206729320 U | 12/2017 |
| CN | 107974207 A | 5/2018 |
| CN | 108170370 A | 6/2018 |
| CN | 108514186 A | 9/2018 |
| DE | 3635831 A1 | 5/1988 |
| DE | 10141568 A1 | 6/2002 |
| JP | S63209604 A | 8/1988 |
| JP | 2004097401 A | 4/2004 |
| KR | 20040013304 A | 2/2004 |
| KR | 20110084637 A | 7/2011 |
| KR | 20170107005 A | 9/2017 |
| WO | WO 2014180211 A1 | 11/2014 |

OTHER PUBLICATIONS

Written Opinion of International Application No. PCT/CN2018/121988, dated Feb. 26, 2019, 9 pages (English Translation provided).

* cited by examiner

METHOD FOR PRODUCING ANTIBACTERIAL SHOCK ABSORBING SHOES

FIELD OF THE DISCLOSURE

The present disclosure relates to a shoemaking process, and more particularly, to a method for producing antibacterial shock absorbing shoes.

BACKGROUND OF THE DISCLOSURE

Shoes are one of the necessities in people's life and production activities. In the traditional shoemaking method, many shoemaking industries adopt the shoemaking method of adhesive technology or sewing technology. Since the glue used in the existing shoemaking technology is not strong in adhesion, the shoes manufactured by the glue and the manufacturing technology in the prior art are easy to become unglued or become permeable to water after wearing for a period of time, and the service life of the shoes is short. Shoes manufactured by the manufacturing technology in the prior art have poor elasticity and breathability, feet are easy to sweat, and be worn and fatigue when people walk. The breathability of the shoes is poor, and moisture in the shoes cannot be discharged, which easily causes the odor of the feet and the odor generated by the feet is difficult to be discharged. Toes in a humid and air-tight environment for a long time are easy to be infected with fungi, and then beriberi is caused. The odor generated by the feet is unpleasant, so people may feel particularly embarrassed when taking off shoes in public places such as baths, saunas and the like. In addition, the shoes manufactured in the prior art have no antibacterial, anti-inflammatory and other effects, and the feet are easy to be infected when the feet are worn or have wounds.

SUMMARY OF THE DISCLOSURE

The present disclosure is intended to overcome the defects in the prior art and provide a method for producing antibacterial shock absorbing shoes.

The technical solution adopted in the present disclosure is a method for producing antibacterial shock absorbing shoes, which comprises the following steps of:

first step: designing a shoe tree and a shoe style by a designer, selecting materials for manufacturing a vamp, a leather pad, a sole and a shoe pad, and matching colors;

second step: attaching paper to an outside of the shoe tree, drawing a style required, taking the paper off the shoe tree, and pasting the paper on a paper sheet to make a paper pattern;

third step: cutting the material of the vamp selected in the first step according to the paper pattern manufactured in the second step, sewing and splicing the cut material through a sewing machine to manufacture the vamp; cutting the material of the sole selected in the first step according to the paper pattern manufactured in the second step to manufacture the sole; cutting the material of the shoe pad selected in the first step according to the paper pattern manufactured in the second step to respectively manufacture a bottom pad, a middle pad and a foot pad, and respectively punching holes in the middle pad and the foot pad;

fourth step: selecting the leather pad, punching semi-spherical protrusions on the leather pad and punching a connecting groove between two adjacent semi-spherical protrusions, forming a circular pinhole in a top end of the semi-spherical protrusion, coating glue in the semi-spherical protrusion and pasting semi-spherical sponge particles in the semi-spherical, placing the leather pad into a treatment tank to soak the leather pad with an antibacterial agent, taking out the leather pad for drying, pasting the leather pad on the middle pad with a glue after drying, and cutting the leather pad to manufacture a shock absorbing massage pad;

fifth step: sleeving the vamp manufactured in the third step on the shoe tree, placing the bottom pad on a bottom of the shoe tree, wrapping the shoes by a plier and a hammer, placing the wrapped shoes into a heating and shaping box for shaping, taking out the shoes after shaping, brushing a glue on the bottom pad, and pasting the sole;

sixth step: coating the glue on a bottom of the shock absorbing massage pad manufactured in the fourth step, and placing the shock absorbing massage pads into the shoes manufactured in the fifth step; and seventh step: coating the glue on a bottom of the foot pad manufactured in the third step, placing the foot pads into the shoes manufactured in the sixth step, and packaging after drying.

Preferably, the glue comprises the following components in parts by weight: 10-15 parts of polyvinyl alcohol, 3-5 parts of borax, 3-4 parts of ethylene glycol, 3-7 parts of methyl acrylate, 10-20 parts of water, 3-8 parts of starch, 1-4 parts of carrageenan, 8-10 parts of pinene resin, 5-15 parts of chloroprene rubber, 1-3 parts of cellulose and 2-4 parts of sodium alginate.

Preferably, the antibacterial agent comprises the following components in parts by weight: 10-25 parts of dipotassium glycyrrhizinate, 2-4 parts of sialic acid, 2-3 parts of acetic acid, 2-4 parts of ferrous sulfate, 10-13 parts of vitamin C, 10-18 parts of rose powder, 5-7 parts of essence, 3-5 parts of sodium carboxymethyl cellulose, 2-10 parts of fatty alcohol polyoxyethylene ether and 1-3 parts of zinc oxide.

Preferably, in the fourth step, the time for soaking is 1-2 hours, and a layer of film forming agent is coated on a surface of the leather pad after soaking.

Preferably, the film forming agent comprises the following components in parts by weight: 8-15 parts of acrylic resin, 3-5 parts of vinyl acetate-ethylene copolymer, 8-10 parts of methyl potassium silicate, 2-3 parts of stearic acid, 3-7 parts of polyether polyurethane resin, 1-5 parts of sulfonate and 4-9 parts of epoxy resin emulsion.

Preferably, the foot pad is made of a high-elasticity material, and the high-elasticity material comprises the following components in parts by weight: 30-35 parts of styrene butadiene rubber, 20-25 parts of ethylene propylene diene monomer, 20-40 parts of polyisoprene, 3-7 parts of wood flour, 15-20 parts of butadiene rubber, 1-3 parts of phosphite antioxidant, 2-5 parts of pentaerythritol, 0.5-1 part of calcium stearate, 1-3 parts of hydrotalcite, 2-7 parts of sodium benzoate, 5-10 parts of salicylanilide, 3-12 parts of curcumin and 1-5 parts of silane coupling agent.

The present disclosure has the beneficial effects that: the steps of antibacterial treatment to the shoe materials, and the steps of special production treatment to the shock absorbing antibacterial pad and the like are added in the method, so that the antibacterial property, breathability and shock absorbing property of the produced shoes can be improved. The produced shoes have high comfort degree and are not easy to make water permeable during long-term use. After the leather pad is treated with an antibacterial agent, the fungi inside the produced shoes can be inhibited and the odor can be removed. In addition, the special structure of the shock absorbing massage pad can enable air in the shoes to circulate for air exchange, prevent the soles of the feet from sliding in the shoes, improve the support and the stability of steps, massage the soles of the feet during walking to relieve foot fatigue, and relieve the shock. The feet can squeeze the sponge after stepping on the shock absorbing antibacterial pad, and the heat generated by the feet can promote the volatilization and release of drugs in the sponge to be contacted with the feet, thus preventing the generation of dermatophytosis.

Still other aspects of the disclosure will become apparent upon a reading and understanding of the following detailed description.

DETAILED DESCRIPTION OF THE EMBODIMENTS

The present disclosure is further described with reference to the detailed embodiments:

Embodiment 1

A method for producing antibacterial shock absorbing shoes comprises the following steps of:

first step: designing a shoe tree and a shoe style by a designer, selecting materials for manufacturing a vamp, a leather pad, a sole and a shoe pad, and matching colors;

second step: attaching paper to an outside of the shoe tree, drawing a style required, taking the paper off the shoe tree, and pasting the paper on a paper sheet to make a paper pattern;

third step: cutting the material of the vamp selected in the first step according to the paper pattern manufactured in the second step, sewing and splicing the cut material through a sewing machine to manufacture the vamp; cutting the material of the sole selected in the first step according to the paper pattern manufactured in the second step to manufacture the sole; cutting the material of the shoe pad selected in the first step according to the paper pattern manufactured in the second step to respectively manufacture a bottom pad, a middle pad and a foot pad, and respectively punching holes in the middle pad and the foot pad;

fourth step: selecting the leather pad, punching semi-spherical protrusions on the leather pad and punching a connecting groove between two adjacent semi-spherical protrusions, forming a circular pinhole in a top end of the semi-spherical protrusion, coating glue in the semi-spherical protrusion and pasting semi-spherical sponge particles in the semi-spherical, placing the leather pad into a treatment tank to soak the leather pad with an antibacterial agent, taking out the leather pad for drying, pasting the leather pad on the middle pad with a glue after drying, and cutting the leather pad to manufacture a shock absorbing massage pad;

fifth step: sleeving the vamp manufactured in the third step on the shoe tree, placing the bottom pad on a bottom of the shoe tree, wrapping the shoes by a plier and a hammer, placing the wrapped shoes into a heating and shaping box for shaping, taking out the shoes after shaping, brushing a glue on the bottom pad, and pasting the sole;

sixth step: coating the glue on a bottom of the shock absorbing massage pad manufactured in the fourth step, and placing the shock absorbing massage pads into the shoes manufactured in the fifth step; and seventh step: coating the glue on a bottom of the foot pad manufactured in the third step, placing the foot pads into the shoes manufactured in the sixth step, and packaging after drying. The shock absorbing massage pad of the shoes manufactured by the method has the semi-spherical protrusions and the sponge adsorbed with the antibacterial agent, and when the feet sweat or emit heat, sweat can be adsorbed by the sponge and interact with the antibacterial agent to avoid sweat odor and bacteria growth. Meanwhile, the antibacterial agent in the sponge is easy to penetrate into the foot pad to be combined with the feet, thus preventing the feet from being infected with fungi, bacteria and the like and preventing foot diseases. In addition, the semi-spherical protrusions and the sponge can massage and buffer the soles of the feet, and prevent the feet from being injured in walking for a long time. All the semi-spherical protrusions in the shock absorbing massage pad in the shoes manufactured by the method are connected together through the connecting groove, so that air can circulate inside the whole shoes, thus avoiding sweat generation and accumulation.

The glue comprises the following components in parts by weight: 10 parts of polyvinyl alcohol, 3 parts of borax, 3 parts of ethylene glycol, 3 parts of methyl acrylate, 20 parts of water, 3 parts of starch, 1 part of carrageenan, 8 parts of pinene resin, 15 parts of chloroprene rubber, 3 parts of cellulose and 2 parts of sodium alginate.

The antibacterial agent comprises the following components in parts by weight: 10 parts of dipotassium glycyrrhizinate, 2 parts of sialic acid, 2 parts of acetic acid, 2 parts of ferrous sulfate, 13 parts of vitamin C, 10 parts of rose powder, 5 parts of essence, 3 parts of sodium carboxymethyl cellulose, 2 parts of fatty alcohol polyoxyethylene ether and 1 part of zinc oxide. The antibacterial agent can completely kill germs such as fungi and bacteria inside the shoes, have aromatic odor, and avoids odor generated by the feet.

In the fourth step, the time for soaking is 1 hour, and a layer of film forming agent is coated on a surface of the leather pad after soaking.

The film forming agent comprises the following components in parts by weight: 8 parts of acrylic resin, 3 parts of vinyl acetate-ethylene copolymer, 10 parts of methyl potassium silicate, 2 parts of stearic acid, 7 parts of polyether polyurethane resin, 1 part of sulfonate and 4 parts of epoxy resin emulsion. Coating the film forming agent can make the antibacterial effect of the leather pad more durable, thus prolonging the antibacterial effect.

The foot pad is made of a high-elasticity material, and the high-elasticity material comprises the following components in parts by weight: 35 parts of styrene butadiene rubber, 20 parts of ethylene propylene diene monomer, 20 parts of polyisoprene, 3 parts of wood flour, 15 parts of butadiene rubber, 3 parts of phosphite antioxidant, 2 parts of pentaerythritol, 0.5 part of calcium stearate, 3 parts of hydrotalcite, 2 parts of sodium benzoate, 5 parts of salicylanilide, 3 parts of curcumin and 1 part of silane coupling agent.

Embodiment 2

A method for producing antibacterial shock absorbing shoes comprises the following steps of:

first step: designing a shoe tree and a shoe style by a designer, selecting materials for manufacturing a vamp, a leather pad, a sole and a shoe pad, and matching colors;

second step: attaching paper to an outside of the shoe tree, drawing a style required, taking the paper off the shoe tree, and pasting the paper on a paper sheet to make a paper pattern;

third step: cutting the material of the vamp selected in the first step according to the paper pattern manufactured in the second step, sewing and splicing the cut material through a sewing machine to manufacture the vamp; cutting the material of the sole selected in the first step according to the paper pattern manufactured in the second step to manufacture the sole; cutting the material of the shoe pad selected in the first step according to the paper pattern manufactured in the second step to respectively manufacture a bottom pad, a middle pad and a foot pad, and respectively punching holes in the middle pad and the foot pad;

fourth step: selecting the leather pad, punching semi-spherical protrusions on the leather pad and punching a connecting groove between two adjacent semi-spherical protrusions, forming a circular pinhole in a top end of the semi-spherical protrusion, coating glue in the semi-spherical protrusion and pasting semi-spherical sponge particles in the semi-spherical, placing the leather pad into a treatment tank to soak the leather pad with an antibacterial agent, taking out the leather pad for drying, pasting the leather pad on the middle pad with a glue after drying, and cutting the leather pad to manufacture a shock absorbing massage pad;

fifth step: sleeving the vamp manufactured in the third step on the shoe tree, placing the bottom pad on a bottom of the shoe tree, wrapping the shoes by a plier and a hammer, placing the wrapped shoes into a heating and shaping box for shaping, taking out the shoes after shaping, brushing a glue on the bottom pad, and pasting the sole;

sixth step: coating the glue on a bottom of the shock absorbing massage pad manufactured in the fourth step, and placing the shock absorbing massage pads into the shoes manufactured in the fifth step; and seventh step: coating the glue on a bottom of the foot pad manufactured in the third step, placing the foot pads into the shoes manufactured in the sixth step, and packaging after drying.

The glue comprises the following components in parts by weight: 12 parts of polyvinyl alcohol, 4 parts of borax, 4 parts of ethylene glycol, 5 parts of methyl acrylate, 15 parts of water, 5 parts of starch, 2 parts of carrageenan, 9 parts of pinene resin, 10 parts of chloroprene rubber, 2 parts of cellulose and 3 parts of sodium alginate.

The antibacterial agent comprises the following components in parts by weight: 17 parts of dipotassium glycyrrhizinate, 3 parts of sialic acid, 3 parts of acetic acid, 3 parts of ferrous sulfate, 12 parts of vitamin C, 15 parts of rose powder, 6 parts of essence, 4 parts of sodium carboxymethyl cellulose, 5 parts of fatty alcohol polyoxyethylene ether and 2 parts of zinc oxide.

In the fourth step, the time for soaking is 1.5 hours, and a layer of film forming agent is coated on a surface of the leather pad after soaking.

The film forming agent comprises the following components in parts by weight: 12 parts of acrylic resin, 4 parts of vinyl acetate-ethylene copolymer, 9 parts of methyl potassium silicate, 3 parts of stearic acid, 5 parts of polyether polyurethane resin, 4 part of sulfonate and 6 parts of epoxy resin emulsion.

The foot pad is made of a high-elasticity material, and the high-elasticity material comprises the following components in parts by weight: 33 parts of styrene butadiene rubber, 22 parts of ethylene propylene diene monomer, 30 parts of polyisoprene, 5 parts of wood flour, 17 parts of butadiene rubber, 2 parts of phosphite antioxidant, 4 parts of pentaerythritol, 0.8 part of calcium stearate, 2 parts of hydrotalcite, 5 parts of sodium benzoate, 9 parts of salicylanilide, 8 parts of curcumin and 3 parts of silane coupling agent.

Embodiment 3

A method for producing antibacterial shock absorbing shoes comprises the following steps of:

first step: designing a shoe tree and a shoe style by a designer, selecting materials for manufacturing a vamp, a leather pad, a sole and a shoe pad, and matching colors;

second step: attaching paper to an outside of the shoe tree, drawing a style required, taking the paper off the shoe tree, and pasting the paper on a paper sheet to make a paper pattern;

third step: cutting the material of the vamp selected in the first step according to the paper pattern manufactured in the second step, sewing and splicing the cut material through a sewing machine to manufacture the vamp; cutting the material of the sole selected in the first step according to the paper pattern manufactured in the second step to manufacture the sole; cutting the material of the shoe pad selected in the first step according to the paper pattern manufactured in the second step to respectively manufacture a bottom pad, a middle pad and a foot pad, and respectively punching holes in the middle pad and the foot pad;

fourth step: selecting the leather pad, punching semi-spherical protrusions on the leather pad and punching a connecting groove between two adjacent semi-spherical protrusions, forming a circular pinhole in a top end of the semi-spherical protrusion, coating glue in the semi-spherical protrusion and pasting semi-spherical sponge particles in the semi-spherical, placing the leather pad into a treatment tank to soak the leather pad with an antibacterial agent, taking out the leather pad for drying, pasting the leather pad on the middle pad with a glue after drying, and cutting the leather pad to manufacture a shock absorbing massage pad;

fifth step: sleeving the vamp manufactured in the third step on the shoe tree, placing the bottom pad on a bottom of the shoe tree, wrapping the shoes by a plier and a hammer, placing the wrapped shoes into a heating and shaping box for shaping, taking out the shoes after shaping, brushing a glue on the bottom pad, and pasting the sole;

sixth step: coating the glue on a bottom of the shock absorbing massage pad manufactured in the fourth step, and placing the shock absorbing massage pads into the shoes manufactured in the fifth step; and seventh step: coating the glue on a bottom of the foot pad manufactured in the third step, placing the foot pads into the shoes manufactured in the sixth step, and packaging after drying.

The glue comprises the following components in parts by weight: 15 parts of polyvinyl alcohol, 5 parts of borax, 4 parts of ethylene glycol, 7 parts of methyl acrylate, 10 parts of water, 8 parts of starch, 4 part of carrageenan, 10 parts of pinene resin, 15 parts of chloroprene rubber, 3 parts of cellulose and 4 parts of sodium alginate.

The antibacterial agent comprises the following components in parts by weight: 25 parts of dipotassium glycyrrhizinate, 4 parts of sialic acid, 3 parts of acetic acid, 4 parts of ferrous sulfate, 10 parts of vitamin C, 18 parts of rose powder, 7 parts of essence, 5 parts of sodium carboxymethyl cellulose, 10 parts of fatty alcohol polyoxyethylene ether and 3 parts of zinc oxide.

In the fourth step, the time for soaking is 2 hours, and a layer of film forming agent is coated on a surface of the leather pad after soaking.

The film forming agent comprises the following components in parts by weight: 15 parts of acrylic resin, 5 parts of vinyl acetate-ethylene copolymer, 8 parts of methyl potassium silicate, 3 parts of stearic acid, 3 parts of polyether polyurethane resin, 5 part of sulfonate and 9 parts of epoxy resin emulsion.

The foot pad is made of a high-elasticity material, and the high-elasticity material comprises the following components in parts by weight: 30 parts of styrene butadiene rubber, 20 parts of ethylene propylene diene monomer, 20 parts of polyisoprene, 3 parts of wood flour, 15 parts of butadiene rubber, 1 part of phosphite antioxidant, 2 parts of pentaerythritol, 0.5 part of calcium stearate, 1 part of hydrotalcite, 2 parts of sodium benzoate, 5 parts of salicylanilide, 3 parts of curcumin and 5 parts of silane coupling agent.

When the medicine effect of the liquid medicine in the shock absorbing massage pad in Embodiment 1, Embodiment 2 and Embodiment 3 has been volatilized or the medicine effect has been decreased, the antibacterial agent can be newly prepared and sucked into a syringe to be injected into the shock absorbing antibacterial pad through the hole in the foot pad and the pinhole in the top end of the semi-spherical protrusion in the shock absorbing massage pad, the surplus liquid medicine in the sponge flows into other sponges and semi-spherical protrusions through the connecting groove, and the shock absorbing massage pad is dried after injection and can be used after drying.

Use Effect Experiment:

In this study, 1000 users experience the wearing of the shoes manufactured by the method for producing antibacterial shock absorbing shoes, and the scoring standard of the test item is: 5 points for very satisfied degree, 4 points for satisfied degree, 3 points for general degree, 2 points for unsatisfied degree, and 1 point for very unsatisfied degree. Wherein, the general group is the experience satisfaction degree of shoes manufactured by ordinary shoemaking process, and the specific data are as follows:

| Test item | Embodiment 1 | Embodiment 2 | Embodiment 3 | General group |
| --- | --- | --- | --- | --- |
| Water permeability | 4.8 | 4.9 | 4.7 | 3.0 |
| Glue failure | 4.8 | 4.9 | 4.9 | 2.0 |
| Antibacterial property | 4.7 | 4.9 | 4.8 | 1.0 |
| Shock absorbing property | 4.7 | 4.9 | 4.6 | 3.2 |
| Breathability | 4.6 | 4.8 | 4.9 | 2.8 |

In conclusion, the steps of antibacterial treatment to the shoe materials, special production treatment to the shock absorbing antibacterial pad and the like are added in the method, so that the antibacterial property, breathability and shock absorbing property of the produced shoes can be improved. The produced shoes have high comfort degree and are not easy to make water permeable during long-term use. After the leather pad is treated with an antibacterial agent, the fungi inside the produced shoes can be inhibited and the odor can be removed. In addition, the special structure of the shock absorbing massage pad can enable air in the shoes to circulate for air exchange, prevent the soles of the feet from sliding in the shoes, improve the support and the stability of steps, massage the soles of the feet during walking to relieve foot fatigue, and relieve the shock. The feet can squeeze the sponge after stepping on the shock absorbing antibacterial pad, and the heat generated by the feet can promote the volatilization and release of liquid medicine in the sponge to be contacted with the feet, thus preventing the generation of dermatophytosis. In order to improve the antibacterial and anti-inflammatory effects of the shoes manufactured by the method described in the present disclosure, traditional Chinese medicine extracts can be added into the foot pad. The traditional Chinese medicine extracts comprises the following components in parts by weight:5-15 parts of *magnolia* flower, 3-8 parts of sweet *osmanthus,* 8-10 parts of garden balsam stem, 3-5 parts of golden cypress, 7-20 parts of *Pulsatilla chinensis,* 3-6 parts of ginger, 2-9 parts of eupatorium and 5-4 parts of *Houttuynia cordata.*

Those skilled in the art can make various other corresponding changes and modifications according to the above technical solutions and concepts, which shall all fall within the protection scope of the claims of the present disclosure.

The invention claimed is:

1. A method for producing antibacterial shock absorbing shoes, wherein the method comprises the following steps of:

first step: designing a shoe tree and a shoe style by a designer, selecting materials for manufacturing a vamp, a leather pad, a sole and a shoe pad, and matching colors;

second step: attaching paper to an outside of the shoe tree, drawing a style required, taking the paper off the shoe tree, and pasting the paper on a paper sheet to make a paper pattern;

third step: cutting the material of the vamp selected in the first step according to the paper pattern manufactured in the second step, sewing and splicing the cut material through a sewing machine to manufacture the vamp; cutting the material of the sole selected in the first step according to the paper pattern manufactured in the second step to manufacture the sole; cutting the material of the shoe pad selected in the first step according to the paper pattern manufactured in the second step to manufacture a bottom pad, a middle pad and a foot pad, and punching holes in the middle pad and the foot pad;

fourth step: selecting the leather pad, punching semi-spherical protrusions on the leather pad and punching a connecting groove between two adjacent semi-spherical protrusions, forming a circular pinhole in a top end of the semi-spherical protrusion, coating glue in the semi-spherical protrusion and pasting semi-spherical sponge particles in the semi-spherical, placing the leather pad into a treatment tank to soak the leather pad with an antibacterial agent, taking out the leather pad for drying, pasting the leather pad on the middle pad with a glue after drying, and cutting the leather pad to manufacture a shock absorbing massage pad;

fifth step: sleeving the vamp manufactured in the third step on the shoe tree, placing the bottom pad on a bottom of the shoe tree, wrapping the shoes by a plier and a hammer, placing the wrapped shoes into a heating and shaping box for shaping, taking out the shoes after shaping, brushing a glue on the bottom pad, and pasting the sole;

sixth step: coating the glue on a bottom of the shock absorbing massage pad manufactured in the fourth step, and placing the shock absorbing massage pads into the shoes manufactured in the fifth step; and seventh step: coating the glue on a bottom of the foot pad manufactured in the third step, placing the foot pads into the shoes manufactured in the sixth step, and packaging after drying.

2. The method for producing antibacterial shock absorbing shoes according to claim 1, wherein the glue comprises the following components in parts by weight: 10-15 parts of polyvinyl alcohol, 3-5 parts of borax, 3-4 parts of ethylene glycol, 3-7 parts of methyl acrylate, 10-20 parts of water, 3-8 parts of starch, 1-4 parts of carrageenan, 8-10 parts of pinene resin, 5-15 parts of chloroprene rubber, 1-3 parts of cellulose and 2-4 parts of sodium alginate.

3. The method for producing antibacterial shock absorbing shoes according to claim 1, wherein the antibacterial agent comprises the following components in parts by weight: 10-25 parts of dipotassium glycyrrhizinate, 2-4 parts of sialic acid, 2-3 parts of acetic acid, 2-4 parts of ferrous sulfate, 10-13 parts of vitamin C, 10-18 parts of rose powder, 5-7 parts of essence, 3-5 parts of sodium carboxymethyl cellulose, 2-10 parts of fatty alcohol polyoxyethylene ether and 1-3 parts of zinc oxide.

4. The method for producing antibacterial shock absorbing shoes according to claim 1, wherein the time for soaking is 1-2 hours in the fourth step, and a layer of film forming agent is coated on a surface of the leather pad after soaking.

5. The method for producing antibacterial shock absorbing shoes according to claim 4, wherein the film forming agent comprises the following components in parts by weight: 8-15 parts of acrylic resin, 3-5 parts of vinyl acetate-ethylene copolymer, 8-10 parts of methyl potassium silicate, 2-3 parts of stearic acid, 3-7 parts of polyether polyurethane resin, 1-5 parts of sulfonate and 4-9 parts of epoxy resin emulsion.

6. The method for producing antibacterial shock absorbing shoes according to claim 1, wherein the foot pad is made of a high-elasticity material, and the high-elasticity material comprises the following components in parts by weight: 30-35 parts of styrene butadiene rubber, 20-25 parts of ethylene propylene diene monomer, 20-40 parts of polyisoprene, 3-7 parts of wood flour, 15-20 parts of butadiene rubber, 1-3 parts of phosphite antioxidant, 2-5 parts of pentaerythritol, 0.5-1 part of calcium stearate, 1-3 parts of hydrotalcite, 2-7 parts of sodium benzoate, 5-10 parts of salicylanilide, 3-12 parts of curcumin and 1-5 parts of silane coupling agent.

7. The method for producing antibacterial shock absorbing shoes according to claim 4, wherein the foot pad is made of a high-elasticity material, and the high-elasticity material comprises the following components in parts by weight: 30-35 parts of styrene butadiene rubber, 20-25 parts of ethylene propylene diene monomer, 20-40 parts of polyisoprene, 3-7 parts of wood flour, 15-20 parts of butadiene rubber, 1-3 parts of phosphite antioxidant, 2-5 parts of pentaerythritol, 0.5-1 part of calcium stearate, 1-3 parts of hydrotalcite, 2-7 parts of sodium benzoate, 5-10 parts of salicylanilide, 3-12 parts of curcumin and 1-5 parts of silane coupling agent.

\* \* \* \* \*